Patented Mar. 8, 1938

2,110,178

UNITED STATES PATENT OFFICE 2,110,178

COLLOID PREPARATION

Simon L. Ruskin, New York, N. Y., assignor to Frances R. Ruskin, New York, N. Y.

No Drawing. Application November 29, 1933, Serial No. 700,369

13 Claims. (Cl. 95—7)

This invention relates to the treatment of colloids and more particularly to influencing the properties of colloidal gels and sols.

It is known that an increase of the osmotic pressure of a gelatine or other protein solution or gel has a favorable effect upon the latter since it will prolong its stability, will prevent the premature giving off of water and will render it more resistant to aging, while reducing the osmotic pressure shortens the life of such a colloidal sol or gel. It is furthermore known that an increase of the H-ion concentration of such a colloid increases also its stability while a decrease has an opposite effect since it accelerates its aging.

There are, however, no means known which permit of increasing the H-ion concentration of such a colloidal gel or sol without lowering at the same time its osmotic pressure. Hence, the favorable effect of an increase in the H-ion concentration upon aging is counterbalanced or does not at all become evident on account of the simultaneously occurring unfavorable lowering of the osmotic pressure.

Now, one object of this invention consists in overcoming these difficulties by adding a substance to the colloidal gel or sol which does not lower its osmotic pressure although it favorably influences its H-ion concentration. This is of great importance in many fields of industrial application, for instance in the photographic industry for increasing the stability and improving the quality of the gelatin, for making photographic emulsions better available for tropical use, and for improving the hot drying of photographic material.

Another object of this invention consists in producing gelatin for various purposes of always the same quality. In the manufacture of gelatin by the methods known hitherto, almost every batch differs from the preceding ones which differences are due to variations in the pH-value and the osmotic pressure. All the methods used hitherto to overcome these variations were ineffective and usually decreased the value of the gelatin. The difficulties are eliminated in accordance with the invention by the addition of substances to the gelatin batches which influence their H-ion concentration without lowering their osmotic pressure. In this manner it is possible to produce a gelatin of standard quality without disturbance of the light sensitivity of photographic emulsions.

Another object of this invention consists in preserving the adhesive properties of glues so that they are not so readily subject to aging and can be kept fresh for a longer period of time than hitherto possible. This is accomplished by the addition of certain substances which will be described in detail hereinafter.

A further object of this invention consists in increasing the sensitivity of photosensitive emulsions by the addition of substances which influence their H-ion concentration without unfavorably influencing their osmotic pressure.

Still another object of this invention consists in increasing the heat resistance of photosensitive emulsions by the addition of substances which increase their H-ion concentration and osmotic pressure without otherwise influencing the properties of said emulsions. Hereby also another advantage is achieved inasmuch as such emulsions do not age as quickly as emulsions without these additions.

A further object of this invention consists in preserving the colloidal properties of paints, especially of varnishes and the like which contain pigments in colloidal dispersion, and in retarding or preventing the settling of the pigments on standing for a longer period of time.

Still another object of this invention consists in producing varnishes which are more heat resistant than the ordinary varnishes.

Still another object of this invention is increasing the heat resistance, pliability and diminishing the fragility of colloidal cellulose and cellulose products such as cellulose esters, etc. collodion and paper.

These objects of the invention as well as others which will become evident from the specification and the claims annexed hereto, are attained by adding to the colloidal gels or sols substances having the properties of "hydrogen acceptors", such as glutathione, ergothioeine and the like in their reduced (—SH) and oxidized form (—S—S—), methylene blue and the like dyestuffs in the leuco and oxidized form, insulin and the like. These "hydrogen acceptors" exert their favorable effects upon colloidal gels and sols without at the same time lowering the osmotic pressure of said colloids.

For the purpose of disclosing the invention, I shall describe the sensitization of photographic emulsions, the method of increasing the heat resistance and improving the aging resistance of photographic emulsions, the standardization of various batches of gelatin, the production of a glue the aging properties of which are considerably improved, and the manufacture of non-settling varnishes containing pigments in colloidal suspension.

Example 1

1 kg. of an ordinary photographic emulsion is molten and mixed thoroughly with 0.007% of its weight or 70 mg. of glutathione in the relatively pure condition in its oxidized form (—S—S—) and is then used for coating photographic films, papers and the like. It was found that the sensitivity of the emulsion was increased by more than 100% by the addition of glutathione and that an emulsion treated in this manner preserved its higher sensitivity over a longer period of time than an untreated one.

Thus, it is possible to produce emulsions of different sensitivity by the addition of more or less glutathione or its equivalents to a standard emulsion.

Example 2

100 mg. of glutathione in its reduced and relatively pure form (—SH) are added, while stirring vigorously, to 1 kg. of a molten ordinary photographic emulsion whereafter the latter is worked up as usual to photographic films, plates, papers, or the like according to the properties of the original emulsion. It was found that the heat resistance of an emulsion treated in this manner was four to five times better than that of the original emulsion. The sensitivity of the emulsion, however, was somewhat reduced while the aging properties were considerably improved.

Example 3

The various gelatin solutions obtained by boiling certain animal substances, as hides, bones, cartilage and the like in water, are mixed with various amounts of glutathione either in its reduced or its oxidized form whereby these solutions are adjusted to the desired osmotic pressure and pH-value. The gelatins obtained from various batches possess after standardization with glutathione or its equivalents the same properties although they may have been obtained from different sources and under different conditions.

Standardized gelatins of this kind possess for instance the same swelling capacity, the same adhesive power, require the same drying time, resist aging to the same degree and are also in other respects alike. Thus, this method represents a simple and convenient way of eliminating variations and inequalities in the properties of gelatin.

Example 4

To one liter of an ordinary glue solution are added 100 to 250 mg. of glutathione in its reduced form (—SH). Thereby the aging properties of said glue are improved to such a degree that the glue can easily be kept fresh for a period of half a year to a year while hitherto glue usually lost its adhesive properties after a few weeks of keeping.

Example 5

0.5 gram of glutathione in its reduced form are added to 1 kg. of an ordinary oil varnish containing inorganic pigments in colloidal suspension, the glutathione content being thus 0.05%. Thereby the settling of the pigment is retarded for a considerably longer period of time than without this addition.

Other compounds may be added in the above given examples instead of glutathione. The proportions of the additions may also be changed according to the requirements; a fraction only of one percent will ordinarily be sufficient, amounts up to about 0.1% being adequate for most purposes.

It will thus be seen that my invention provides a very simple way of standardizing and improving the qualities of colloidal solutions or gels of the most varied kind, such as shellac, colloidal medicines, natural and synthetic resins, the above mentioned colloids and the like. The examples mentioned above serve merely to illustrate the invention without, however, limiting it to them; as variations may be made by those skilled in the art in accordance with the principles set forth herein and in the claims annexed hereto.

Where in the claims I refer to glutathione, such term is to be understood as including both the oxidized (—S—S—) and the reduced (—SH) forms of the compound.

I claim:

1. The method of treating a photographic emulsion containing gelatin which comprises the addition thereto of a small quantity of glutathione of the order of 0.007 to 0.01% by weight of the gelatin.

2. The method of treating a photographic emulsion containing gelatin which comprises the addition thereto of about 0.01% of relatively pure glutathione.

3. The method of improving the stability and keeping properties of a gelatin which comprises adding thereto a fraction of one percent of glutathione.

4. The method of improving the stability and keeping properties of a gelatin which comprises the addition thereto of an appreciable quantity up to about 0.1% by weight of relatively pure glutathione.

5. The method of improving the stability and keeping properties of a gelatin which comprises the addition thereto of about 0.1% in relative amount of glutathione.

6. A stabilized clear gelatin containing an addition of a fraction of one per cent by weight of relatively pure glutathione.

7. A stabilized gelatin containing an addition of a fraction of one percent of relatively pure glutathione.

8. A stabilized gelatin containing an addition of about 0.007% of glutathione.

9. A photographic paper having a coating of a gelatin emulsion containing an addition of a fraction of one percent of glutathione.

10. The method of improving the qualities of a photographic emulsion containing gelatin which comprises adding thereto a fraction of one percent of glutathione.

11. The method of standardizing various batches of gelatin which comprises adding thereto a fraction of one percent of relatively pure reduced glutathione.

12. The method of standardizing various batches of gelatin which comprises adding thereto up to about 0.1% of reduced glutathione.

13. A stabilized gelatin containing an addition of a fraction of one percent by weight of relatively pure glutathione.

SIMON L. RUSKIN.